(12) United States Patent
Lisk

(10) Patent No.: US 11,944,080 B2
(45) Date of Patent: Apr. 2, 2024

(54) TEMPERATURE CONTROL SYSTEM FOR REMOTE WATER TANKS

(71) Applicant: Mike Lisk, Cloudcroft, NM (US)

(72) Inventor: Mike Lisk, Cloudcroft, NM (US)

( * ) Notice: Subject to any disclaimer, the term of this patent is extended or adjusted under 35 U.S.C. 154(b) by 1321 days.

(21) Appl. No.: 15/922,137

(22) Filed: Mar. 15, 2018

(65) Prior Publication Data

US 2018/0263212 A1  Sep. 20, 2018

Related U.S. Application Data

(60) Provisional application No. 62/471,626, filed on Mar. 15, 2017.

(51) Int. Cl.
| | | |
|---|---|---|
| *A01K 7/02* | (2006.01) | |
| *F24D 18/00* | (2022.01) | |
| *F24D 101/40* | (2022.01) | |
| *F24D 103/13* | (2022.01) | |

(Continued)

(52) U.S. Cl.
CPC .............. *A01K 7/027* (2013.01); *A01K 7/025* (2013.01); *F24D 18/00* (2022.01); *F24D 2101/40* (2022.01); *F24D 2103/13* (2022.01); *F24D 2105/00* (2022.01); *F24H 1/201* (2013.01); *F24H 2240/01* (2013.01); *F24H 2240/09* (2013.01)

(58) Field of Classification Search
CPC ........ A01K 7/025; A01K 7/027; F24H 1/201; F24H 2240/01; F24H 2240/09; F24D 18/00; F24D 2101/40; F24D 2103/13; F24D 2105/00
USPC ........................................................ 126/563
See application file for complete search history.

(56) References Cited

U.S. PATENT DOCUMENTS

| | | | | |
|---|---|---|---|---|
| 3,556,199 A | * | 1/1971 | De Groote | ............ F28D 1/0213 165/104.19 |
| 3,618,625 A | * | 11/1971 | Walters | .................. A01K 7/025 236/93 R |
| 4,326,499 A | | 4/1982 | Koskela | |

(Continued)

FOREIGN PATENT DOCUMENTS

| | | | | |
|---|---|---|---|---|
| DE | 3802518 C2 | * | 3/1996 | ............. A01K 7/027 |
| KR | 2010135357 A | * | 12/2010 | ............. F24D 15/02 |
| WO | 2011/047475 A1 | | 4/2011 | |

OTHER PUBLICATIONS

DE 3802518 C2—Translation (Year: 1996).*

(Continued)

*Primary Examiner* — Steven B McAllister
*Assistant Examiner* — Benjamin W Johnson
(74) *Attorney, Agent, or Firm* — PIERSON FERDINAND LLP; Keats Quinalty

(57) ABSTRACT

In one aspect, the present disclosure is directed to preventing or lessening ice in remote water tanks. The remote water tanks can include a body at least partially defining a chamber that receives a liquid and having an open top portion that provides one or more animals access to the liquid. Further, a heat exchanger can be at least partially received within the chamber, and can receive a thermal transfer fluid that is circulated therethrough to maintain a temperature of the liquid in the chamber. Also, an external heat collector can be in fluid communication with the heat exchanger to transfer solar or other heat to the thermal transfer fluid as the thermal transfer fluid is circulated therethrough.

20 Claims, 3 Drawing Sheets

(51) Int. Cl.
F24D 105/00 (2022.01)
F24H 1/20 (2022.01)

(56) References Cited

U.S. PATENT DOCUMENTS

| | | | | |
|---|---|---|---|---|
| 4,552,208 | A | | 11/1985 | Sorensen |
| 4,584,966 | A | * | 4/1986 | Moore ............... A01K 7/00 137/236.1 |
| 4,898,152 | A | | 2/1990 | Kahl |
| 5,908,008 | A | * | 6/1999 | Sensabaugh ......... A01K 7/027 119/80 |
| 5,983,889 | A | | 11/1999 | Thomas |
| 8,146,535 | B1 | * | 4/2012 | Neumann ........... A01K 7/027 119/72 |
| 8,820,404 | B2 | | 9/2014 | Lisk |
| 2010/0037888 | A1 | * | 2/2010 | Gordon .............. F24H 15/225 126/609 |
| 2011/0203572 | A1 | * | 8/2011 | Jackman ............. F24S 90/00 126/714 |
| 2015/0150215 | A1 | * | 6/2015 | Pumphrey ............ A01K 7/04 119/73 |

OTHER PUBLICATIONS

KR 2010135357 A—Translation (Year: 2010).*
International Search Report and Written Opinion dated Jul. 3, 2018 issued in PCT Patent Application No. PCT/US2018/022546.

* cited by examiner

TEMPERATURE CONTROL SYSTEM FOR REMOTE WATER TANKS

CROSS-REFERENCE TO RELATED APPLICATIONS

The present application claims the benefit of U.S. Provisional Patent Application No. 62/471,626, filed Mar. 15, 2017.

INCORPORATION BY REFERENCE

The disclosure of U.S. Provisional Patent Application No. 62/471,626, filed Mar. 15, 2017, is hereby incorporated by reference herein for all purposes as if presented in its entirety.

TECHNICAL FIELD

The present disclosure is, in one aspect, directed to remote water tanks, and more specifically, temperature control systems for remote water tanks.

BACKGROUND

Rural livestock watering tanks, such as on cattle ranches, are often placed at remote locations that generally do not have access to electricity. At lower temperatures, for example, during colder months or seasons, buildup of ice on or in the water in the watering tanks during freezing temperatures may require significant rancher efforts/resources to keep water available to the livestock. Additionally, in cold weather, animals are generally required to expend more energy combatting the cold, and require more food to stay warm. This need for more food will be amplified if the only water available to the animals is at or near freezing temperatures. For example, a beef cow's body temperature is approximately 100.5° F., and consuming cold water, such as from a water tank containing large amounts of ice, may lower the cow's body temperature, thus requiring the cow to eat more food to try to raise or maintain the cow's body temperature. Additionally, insufficient water intake resulting from uncontrolled freezing of the water in the water tank may result in deteriorating body conditions and/or mineral deficiencies of the livestock, which can, for example, cause spontaneous abortions, poor vitality, impactions, etc. On the other hand, providing livestock with warmer water in colder or freezing temperatures can, for example, generally decrease food consumption, lower a rancher's feed costs, and lead to better overall health of the livestock.

One practice to attempt to address this freezing problem involves using windmill energy to stir water. However, relying on a windmill requires consistent wind in the remote location and therefore generally will not work on days in which the wind does not blow or in areas where the wind blows infrequently.

Another conventional approach involves having a person go out and physically break up the ice, such as with a shovel, axe, or other tool. This impractical approach generally requires a significant amount of time and manpower as someone must travel to each water tank and manually break up the ice.

As such, it can be seen that there is a need for a more reliable, low-cost option to eliminate ice buildup in water tanks. The present disclosure addresses these and other related and unrelated issues in the art.

SUMMARY

Briefly described, in one aspect, the present disclosure is directed to a water tank (or tanks) for livestock and a temperature control system for such water tank(s). Remote water tanks, as described herein, can be water tanks that are placed at remote locations about a ranch, farm, etc. The remote locations can be separated by relative large distances, e.g., up to or greater than one mile. The temperature control system may maintain the temperature of or heat water or other potable fluids in the water tank(s) during cold or freezing weather conditions. "Potable fluids," as used herein, means any suitable fluid for consumption by livestock or other animals. The water tank(s) generally can include a body with a chamber for retaining water or other potable fluid and an opening or aperture that provides an animal with access to the fluid.

The temperature control system generally will include a submersed heat exchanger or other heater assembly that is at least partially submersed in the water or other fluid in the water tank. In one example, the submersed heat exchanger has one or more tubes at least partially positioned within the chamber of the water tank. The one or more tubes can receive a thermal transfer fluid that is continuously, intermittently, or dynamically circulated, for example by a pump, through the tube(s) to heat or maintain the temperature of the water/fluid in the water tank. The thermal transfer fluid may be heated by a heat source, for example, an external heat collector, such as a solar heat collector, or other suitable heating device, e.g., a geothermal heat sink, etc., in communication with the tube(s), which provides thermal energy from outside the chamber of the water tank.

For example, the external heat collector can include one or more portions or sections that capture energy or are otherwise activated, e.g., by thermal energy, directly or indirectly, from exposure to the sun, and transfer the captured energy to the thermal transfer fluid to heat the thermal transfer fluid, which is being circulated by the pump through the submersed heat exchanger and the tube(s).

The one or more tubes of the submersed heat exchanger can include a continuous length of tubing with an input and an output in fluid communication with a corresponding output and input of the external heat collector to define a closed loop, where the thermal transfer fluid can be continuously circulated through the external heat collector and the tubing of the submersed heat exchanger. Accordingly, as the thermal transfer fluid is continuously, intermittently, or dynamically circulated, the external heat collector transfers the collected thermal energy, e.g., from the sun and/or the surrounding environment, to the thermal transfer fluid and the heated thermal transfer fluid can heat or maintain an above freezing temperature of the water (or other liquid) in the tank during cold or freezing weather conditions.

The tubing of the submersed heat exchanger and the external heat collector further may be in communication with one or more pumps or other suitable devices operable to circulate or otherwise move the thermal transfer fluid dynamically and/or continuously through the closed loop.

The pump(s) can be powered by a solar power device, such as a 12 Volt solar panel. The solar power device further can be in communication with a battery or other power storage device to store energy for operation of the pump during low sunlight, e.g., cloudy conditions or at night.

The temperature control system can include a temperature control switch that is in communication with or connected to one or more sensors, e.g., temperature gauges, such as a thermostat, thermo-switch or thermometer, arranged at least partially within the water (or other liquid) in the water tank to measure the temperature of the water. The temperature switch further can be in communication with the pump(s), e.g., through a wired connection or wirelessly, and can activate or deactivate the pump(s) when a measured temperature of the water in the tank is below or above predetermined thresholds. The temperature control system further can include a controller, processor, etc. in communication with and operable to control the operations or functions of the one or more sensors, temperature control switch, pump, etc.

The submersed heat exchanger, in addition or in the alternative, can include a unit, such as a container or vessel, which is at least partially received within the water tank creating a space that will at least partially be received within the water or other fluid of the water tank chamber. The tubing of the submersed heat exchanger further can be positioned within the container or vessel, and the container/vessel can have a plurality of inlets/outlets defined therethrough that may allow for water (or other liquid) in the water tank to be circulated into and out of the container/vessel to facilitate heating thereof.

The container/vessel further can include a plurality of holes, apertures, slots, etc. defined along a lower portion or area thereof that allow the water or other liquid in the water tank to flow into the unit, and further may include one or more holes, apertures, slots, etc. or an outlet piping, situated in the upper portion thereof that allows the water or other liquid (heated by the tubing) to exit the container/vessel so that, for example, the heated water can be consumed by livestock/other animals.

In another aspect, the present disclosure is directed to a method of heating water or other liquid in a remote water tank. The method may include providing water to a chamber of a water tank, and continuously, intermittently, or dynamically circulating a thermal transfer fluid in or around the water tank, for example, within a heat exchanger comprising a tubing arranged within or about the water tank, to maintain the temperature of or heat the water in the chamber of the water tank. The method may include heating the thermal transfer fluid using one or more external heat collectors, e.g., a solar heat exchanger, in communication with the tubing. For example, the external heat collectors may transfer solar heat to thermal transfer fluid as the thermal transfer fluid is continuously, intermittently, or dynamically circulated therethrough. The method also may include determining a temperature of the water in the water tank and initiating, changing, or stopping the circulation or flow of the thermal transfer fluid when the temperature of the water is at, above, or below a threshold temperature.

Various objects, features and advantages of the present invention will become apparent to those skilled in the art upon a review of the following detail description, when taken in conjunction with the accompanying drawings.

Figure 1:
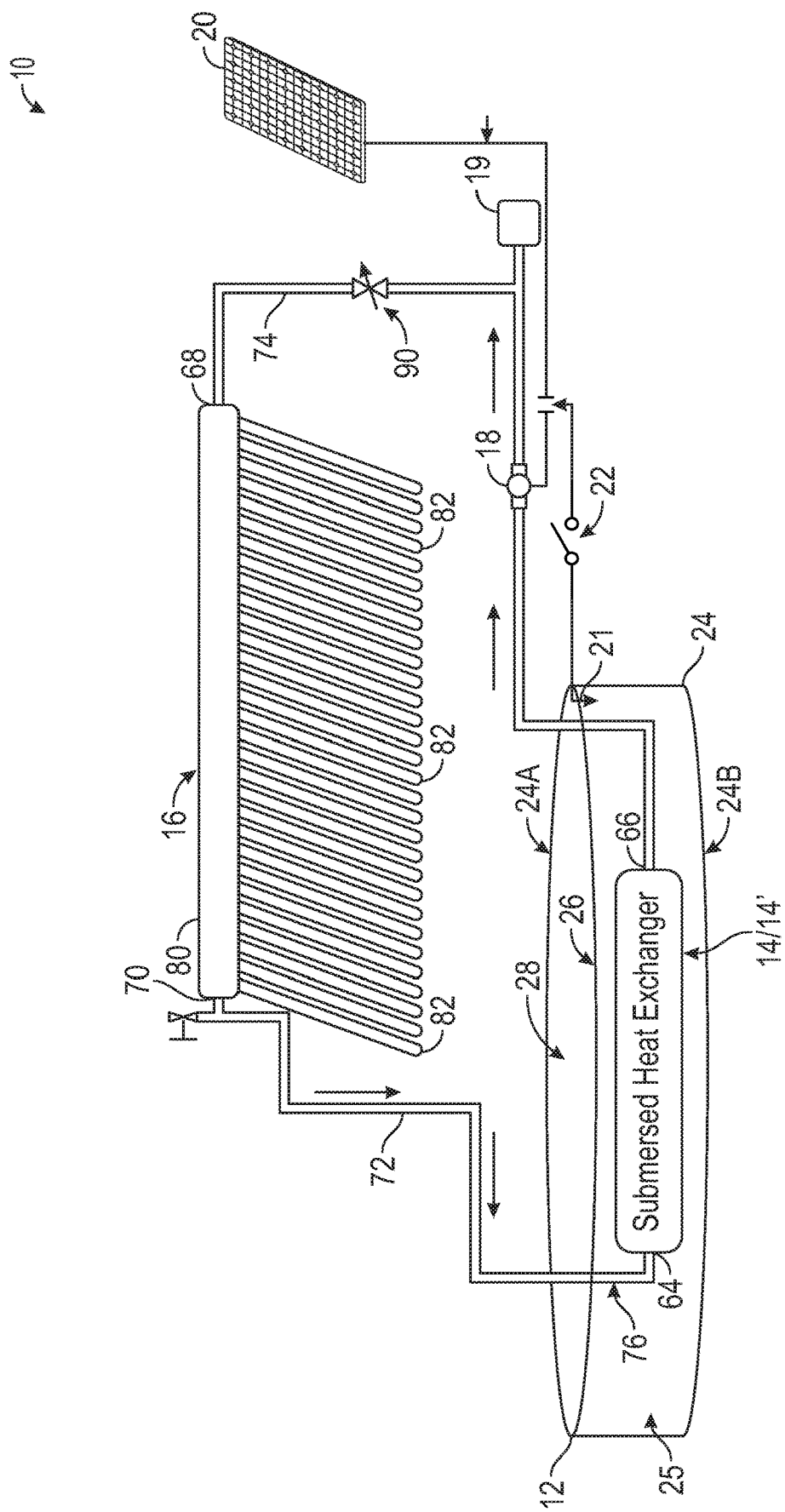
FIG. 1 shows an exemplary temperature control system for a remote water tank according to principles of the present disclosure.

Those skilled in the art will appreciate and understand that, according to common practice, the various features of the drawings discussed below are not necessarily drawn to scale, and that the dimensions of various features and elements of the drawings may be expanded or reduced to more clearly illustrate the embodiments of the present disclosure as described herein.

DETAILED DESCRIPTION

Referring now to the drawings in which like numerals indicate like parts throughout the several views, the present disclosure is generally directed to methods and systems for heating water or other potable liquids in remote water tanks.

FIG. 1 shows a schematic illustration of a temperature control system 10 for preventing and/or reducing freezing of and/or raising the temperature of a liquid (e.g., water or other liquid) in a water tank 12 according to principles of the present disclosure.

As shown in FIG. 1, the system 10 includes a submersed heat exchanger or heating assembly 14/14', one or more external heat exchangers or external heat collectors 16, one or more pumps 18, a pressure regulator 19, at least one solar power source 20, one or more sensors 21, and a temperature controller or temperature control switch 22. At least a portion of the submersed heat exchanger 14/14' is arranged within a chamber 26 of the water tank 12 and is positioned, arranged, or configured to contact, be submerged in or otherwise be in communication with the water or other liquid received in the water tank 12. The heat exchanger 14/14' contains one or more tubes or other suitable fluid conduits or communication paths 23 (FIGS. 2 and 3), or a network thereof, that receives a thermal transfer fluid therein. The thermal transfer fluid is continuously, intermittently, or dynamically circulated through the tube(s) 23 to transfer thermal energy to the water or other fluid in the water tank 12.

For example, as further shown in FIG. 1, the tube(s) 23 can be in communication with the external heat collector(s) 16 and the one or more pumps 18 in a closed loop or a substantially closed loop, which pump(s) 18 can continuously, intermittently, or dynamically circulate the thermal transfer fluid through the closed loop of the external heat collector(s) 16 and the tube(s) 23 of the submersed heat exchanger 14/14'. The pump(s) 18 may be powered using the solar power source 20. The one or more sensors 21, which generally are positioned at or below the surface of the liquid in the water tank 12, can include temperature sensors (e.g., a temperature gauge, thermometer, etc.) operable to measure the temperature of the water or other liquid in the tank 12 and can be in communication with the temperature control switch 22 that is operable to start or stop the one or more pumps 18 (which, when turned on, effect circulation of the thermal transfer fluid through the submersed heat exchanger 14/14' and/or external heat collector 16), for example, when the temperature of the water is at, below, or above a threshold temperature. In one embodiment, the temperature control switch 22 will turn on the pump(s) 18 to start circulation of the thermal transfer fluid when the temperature of the fluid in the chamber 26 of the water tank 12 is at or below a first threshold temperature, and will turn off the pump(s) 18 to stop circulation of the thermal transfer fluid when the temperature of the fluid in the chamber 26 of the water tank 12 is at or above a second threshold temperature.

FIG. 1 additionally shows that the water tank 12 can include a body 24 with one or more sidewalls 25 and a chamber 26 for receiving and retaining the water or other liquid. An opening or aperture 28 further can provide animals with access to the water or other liquid to facilitate consumption thereof. Typically, the opening or aperture 28 is exposed to open air to allow for animals/livestock to have access to the water/fluid in the tank 12 and for consumption thereof, thereby exposing the water or other fluid in the chamber 26 of the water tank 12 to low or freezing temperatures in colder months or seasons. The body 24 of the tank 12 can have a generally cylindrical shape, with the opening 28 being at a top or upper portion 24A of the body 24. Any other shapes that provide fluid retention with access for animals can be employed, however, without departing from the present disclosure. For example, other suitable shapes may include cubic, rectangular, spherical, pyramidal, or other polygon, shapes or combinations thereof. The body 24 can be formed from rubber, plastic, polymeric material, such as polyethylene, though the body 24 can be formed from any suitable material or combination of materials without departing from the scope of the present disclosure. Suitable materials for the body 24 include any water impermeable, non-toxic materials with sufficient structural integrity to hold a volume of water or other liquid suitable for purposes of serving as a drinker (e.g., a watering trough) for livestock or other animals. For example, the body 24 can be formed from wood; metallic materials, such as steel, copper, or aluminum; concrete or other cementitious materials; other composite materials, such as fiber reinforced composite materials; and/or combinations thereof. In one example, the sidewalls 25 of the water tank 12 can be at least partially formed from a material that has a relatively low thermal conductivity, such as rubber, concrete or other suitable material.

The water tank 12 further can be in communication with a water (or other liquid) source for filling and refilling the water tank 12 with water or other liquid for consumption by the livestock or other animals. The water source can be in communication with a fill level device or mechanism, such as one or more floats, that is operable to determine a fill level of the water tank 12. As a result, when the fill level of the water tank 12 is below a particular level, the fluid source may provide water to the water tank 12, and when the fill level is above a specific level the water source may be shut off to prevent overflowing of the tank and wasted water. Examples of a fluid source, monitors, and controls are described in U.S. patent application Ser. No. 14/473,206 and U.S. Pat. No. 8,820,404, which are incorporated by reference herein in as set forth in their entireties.

Figure 2:
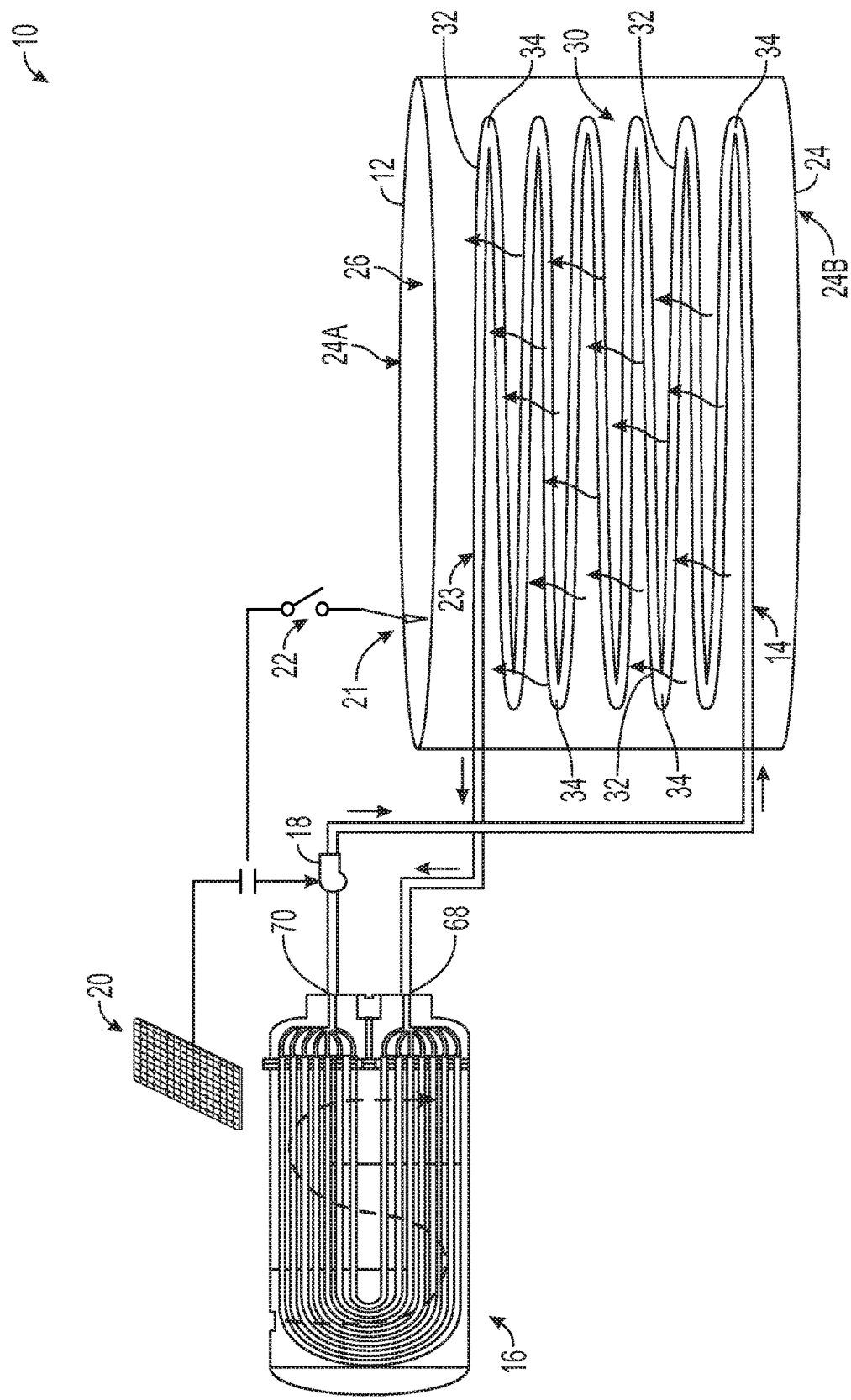
FIG. 2 shows the temperature control system of FIG. 1, with a heat exchanger according to one aspect of the present disclosure.

FIG. 2 shows a schematic view of the system 10 with a submersed heat exchanger 14 according to one aspect of the present disclosure. As shown in FIG. 2, the submersed heat exchanger 14 can include a continuous tubing 23 that is at least partially arranged within the chamber 26 of the water tank 12, for example, so as to be at least partially submerged within the water or other liquid in the water tank 12. The continuous tubing 23 can include a substantially hollow, circular tube, pipe, or other suitable conduit that allows for fluid flow, though the tubing 23 can have any suitable shape or cross-section, such as a square, rectangular, diamond, oval shaped, flat, or segmented cross-section or shape, or combinations thereof, without departing from the present disclosure. Additionally, the tubing 23 of the submersed heat exchanger 14 can include a heat transfer portion 30 with a plurality of substantially parallel portions 32 connected by a plurality of curved or arcuate portions 34. The tubing 23 of the heat exchanger 14 is not limited to the configuration shown in FIG. 2, however, and can include any suitable coiled, spiral, grid or looped shape, arrangement or configuration sufficient to provide a sufficient area to facilitate efficient transfer of thermal energy between the thermal transfer fluid and the water or other potable liquid in the water tank 12.

FIG. 2 further shows that the tubing 23 of the submersed heat exchanger 14 is arranged within the chamber 26 of the water tank 12 and positioned at a height or depth therein so the thermal transfer portion 30 is sufficiently submerged within the water or other liquid in water tank 12 at normal fill levels. For example, the tubing 23 may be positioned at a sufficient distance from the top portion 24A of the body 24 of the water tank 12 to reduce interference with the animal's consumption of the water in the tank 12 and/or to safeguard the animals against injury, e.g., burn related injuries, due to contact with the heated tubing 23. In one example embodiment, the thermal transfer portion 30 of the tubing 23 can be positioned within chamber 26 at a depth of at least 2 in. from the top portion 24A of the water tank 12, though the thermal transfer portion 30 of the tubing 23 can be arranged at any suitable depth from the top portion 24A within the water tank 12, e.g., about 6 inches, about 1 ft., about 2 ft., about 3 ft., etc., or other integer and non-integer numbers therebetween, and/or at, along, or substantially adjacent to a bottom portion or surface 24B of the body 24 of the water tank 12, without departing from the scope of the present disclosure.

At least a portion of the tubing 23, e.g, at least the heat transfer portion 30, can be formed from a conductive material, such as metal, e.g., copper, stainless steel, etc., or other thermally conductive material or combinations thereof, though the tubing 23 can be formed from any material that allows for efficient thermal transfer between the thermal transfer fluid circulated in the tubing 23 and the fluid in the water tank 12, without departing from the scope of the present disclosure. The thermal transfer fluid can include water or can include water and a mixture of at least one chemical agent that reduces the freezing temperature of the water. The at least one chemical agent can include, for example, a food grade antifreeze or other benign additive that is not harmful to animals if ingested. The thermal transfer fluid further may be suitably pressurized to increase the boiling point of the thermal transfer fluid, for example, to reduce, prevent, or inhibit boiling of the thermal transfer fluid at temperatures at or above the boiling point of water.

Figure 3:
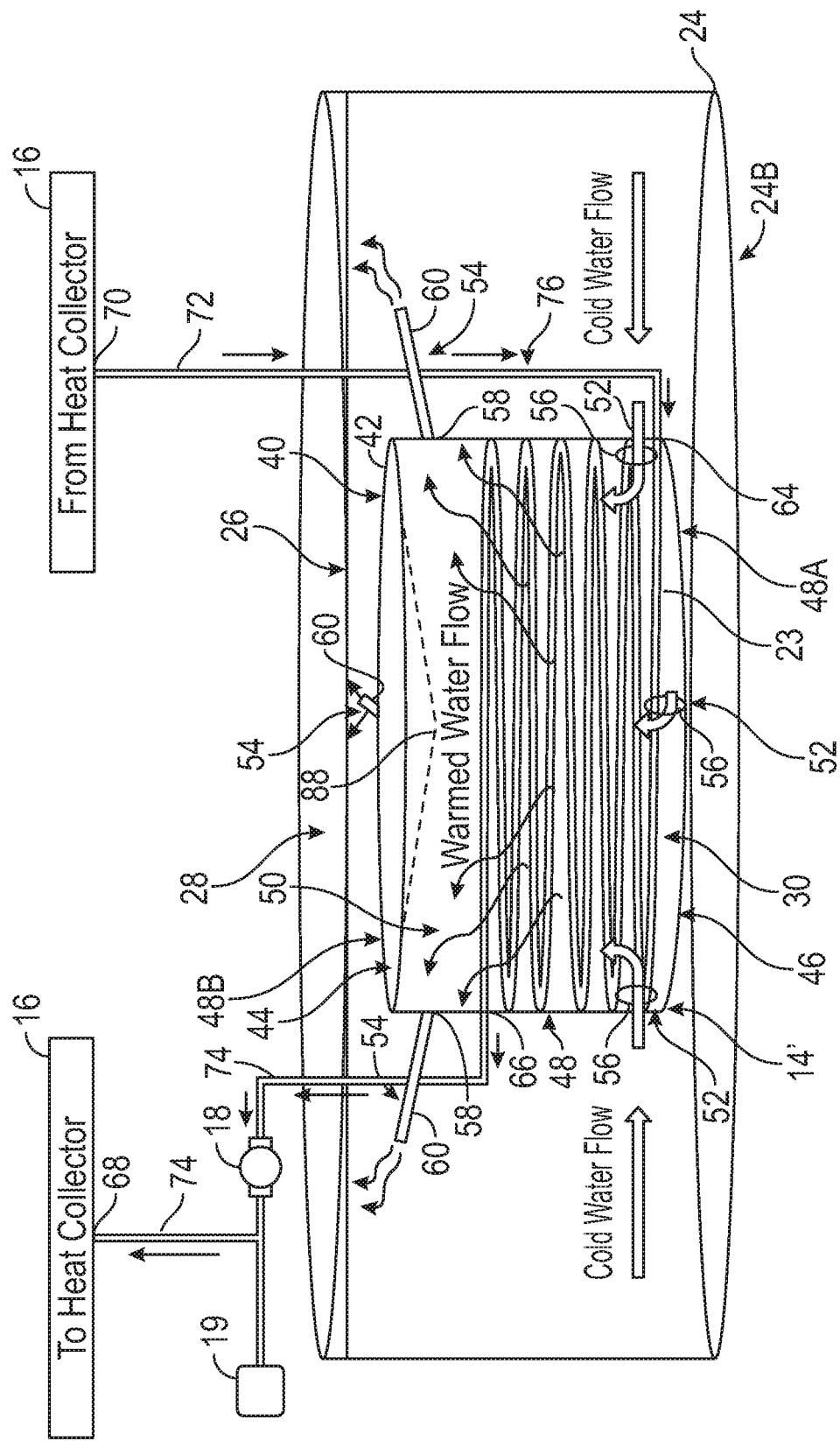
FIG. 3 shows the temperature control system of FIG. 1, with a heat exchanger according to another aspect of the present disclosure.

FIG. 3 shows a further schematic view of the system 10 with a submersed heat exchanger 14' according to another aspect of the present disclosure. With the submersed heat exchanger 14' of FIG. 3, at least a portion of the tubing 23 of the submersed heat exchanger 14' (e.g., the heat transfer portion 30) is at least partially received within a unit, such as a tank, vessel, or other suitable container 40, that is arranged at least partially within the chamber 26 of the water tank 12. In one embodiment, the container 40 has a body 42 with upper 44 and lower 46 portions and a sidewall 48 extending therebetween that at least partially define a chamber 50 that receives the tubing 23. Upper portion 44 can include a lid 88 having a convex, inverted conical, or other shape capable of directing heated water rising within container 40 to the sidewall 48. The body 42 further has one or more inlets 52 and outlets 54 that allow the water or other fluid received in the water tank 12 to be circulated or otherwise flow through the container 40 as it is heated by the water or other fluid with the tubing 23. In this regard, the lid 88 directs upward flowing fluid in the chamber 50 to the one or more outlets 52 to create a fluid current in the water tank 12 as the fluid in the chamber 50 is heated by the tubing 23. The inlets 52 can include a plurality of openings, slots, or other suitable apertures 56 defined through the sidewall 48, for example, along, substantially proximate, or substantially adjacent to, a lower end 48A thereof. The outlets 54 can include a plurality of openings, slots, or other suitable apertures 58 defined through the sidewall 48, e.g., along, proximate, or substantially adjacent to, an upper end 48B thereof. In one example, the openings 58 of the outlets 54 can be in fluid communication with one or more release pipes, conduits, etc. 60 that can direct water or other potable fluid that is warmed by the heat exchanger 14' towards the surface of the water or other potable fluid in the water tank 12 for consumption by livestock or other animals. Accordingly, cold or cooler water (or other liquid) present in water tank 12 will be displaced by the warmer water near the surface and will accumulate at the bottom of water tank 12 where it can be received in the openings 56 of the inlets, warmed by the tubing 23, and then released out of the outlet openings 58 or piping 60 for consumption. For example, thermal currents generated by the heating of the water or other fluid in the container 40 may cause the heated water to rise therein and draw cooler water into the container 40 from the bottom of the tank 12, e.g., through convection currents.

As further shown in FIG. 3, the body 42 of the container 40 can have a generally cylindrical shape, though the body 42 can have any suitable shape, such as a square, rectangular, triangular, or other polygonal shape, or combinations thereof, that allows for receipt of the tubing 23 and circulation of water (or other liquid) in chamber 26, without departing from the scope of the present disclosure. Further, though FIG. 3 shows that the inlets 52 and outlets 54 are arranged along the lower 48A and upper 48B ends of the sidewall 48, respectively, the inlets 52 and outlets 54 can be arranged at any suitable location along the body 42 of the container 40 without departing from the scope of the present disclosure. It will be appreciated, however, that increasing the distance between respective inlets 52 and outlets 54 can improve circulation of the water or other liquid in chamber 26. For example, the inlets 52 can be formed/defined through the lower portion 46 of the body 42 of the container 40 and the outlets 54 can be defined/formed through the upper portion 44 of the body 42 of the container 40. If the inlets 52 are formed along the lower portion of the body 42, the container 40 may be suspended above the bottom 24B of the water tank 12, for example, by one or more supports or other suitable members or assemblies (not shown).

FIG. 1 further shows that the submersed heat exchanger 14/14' has an inlet 64 and an outlet 66 in communication respectively with a corresponding outlet 70 and inlet 68 of the external heat collector 16 to define a closed loop. In one example, the tubing 23 can include a substantially continuous length tubing directly connected to the inlet 68 and outlet 70 of the heat collector 16 (FIG. 2), and alternatively, the tubing 23 can include a plurality of interconnectable sections or portions (FIG. 3). For example, the tubing 23 can have sections or portions 72/74 or other conduit or fluid communication paths or combinations thereof that may place the inlets 64/68 and outlets 66/70 of the external heat collector 16 and submersed heat exchanger 14/14' into fluid communication with each other. For example, section 72 may fluidly couple the outlet 70 of the external heat collector 16 and the inlet 64 of the submersed heat exchanger 14/14', while section 74 may fluidly couple the outlet 66 of the submersed heat exchanger 14/14' and the inlet 68 of the external heat collector 16. The sections 72/74 can include a metal, such as steel, stainless steel, aluminum, etc., tubing, though any suitable tubing or fluid conduit, e.g., a plastic or rubber tubing, can be used without departing from the scope of the present disclosure. Further, insulating materials may be used with at least some portions of sections 72/74. For example, the section 72 that provides the heated thermal transfer fluid from the external heat collector 16 to the submersed heat exchanger 14/14' can include an insulated portion 76 to substantially inhibit, minimize, and/or reduce heat loss of the thermal transfer fluid prior to its introduction into the submersed heat exchanger 14/14'. In one example embodiment, the insulated portions 76 may extend to or at least partially into the chamber 26 or to the thermal transfer section 30, such that the contents of water tank 12 outside of chamber 50 or ambient conditions outside the water tank 12 do not have substantial cooling effects on the thermal transfer fluid in such insulated portion 76.

The thermal transfer fluid is circulated or otherwise moved through the tubing 72/74 to and from the submersed heat exchanger 14/14' and the external heat collector 16 to minimize, reduce, or prevent significant freezing of, melt, and/or to raise or maintain the temperature of the water or other fluid (or ice or other frozen liquid) in the chamber 26 of the water tank 12. For example, as the thermal transfer fluid is continuously, intermittently, or dynamically circulated, the external heat collector 16 transfers collected thermal energy to the thermal transfer fluid so the heated thermal transfer fluid can be circulated through the tubing 23 of the submersed heat exchanger 14/14' to heat or maintain the temperature of the water in the tank 12 during, e.g., cold or freezing weather conditions or to melt ice or other frozen liquid in the water tank 12.

In one embodiment, as shown in FIGS. 1-3, the external heat collector 16 can include one or more solar thermal collectors or other suitable devices that capture and maintain solar energy upon exposure to the sun. The solar thermal collectors can include at least one fluid passageway 80 therein through which the thermal transfer fluid is circulated so that the captured thermal energy can by transferred to or absorbed by the thermal transfer fluid. For example, as shown in FIG. 1, the fluid passageway 80 can be in communication with a network of pipes, tubes, conduits, etc. 82 that are positioned so as to be exposed to the sun, so that heat or thermal energy generated thereby can be at least partially absorbed into a heat absorption medium received in the pipes 82 (e.g., a fluid such as isopropyl alcohol or other suitable heat absorption medium) and transferred to the thermal transfer fluid as it moves through the passageway 80. For example, the pipes 82 can have a round or cylindrical shape or other suitable shape that facilitates substantial absorption of heat or thermal energy from the sun, though the pipes/tubes can have any suitable shape, e.g., square, polygonal, etc., that facilitate sufficient thermal absorption without departing from the scope of the present disclosure. The pipes, tubes, etc. further may have one or more mirrored or otherwise reflective surfaces to increase solar heat retention and/or otherwise minimize heat loss. In one example, the external heat collector(s) 16 includes an evacuated tube collector ("ETC"), such as an ETC Solar Collector as manufactured by Apricus® of Silver Water, New South Wales, Australia. The external heat collector 16, however, can include any suitable passive heat collector, such as a geothermal heat collector or heat sink, without departing from the scope of the present disclosure.

Although only a single external heat collector 16 is shown in FIGS. 1-3, the system 10 can include any suitable number of solar, geothermal, or other suitable heat collectors or combinations thereof, for example, two or more solar heat collectors connected in parallel or series, without departing from the scope of the present disclosure. The external heat collector(s) 16 can heat the thermal transfer fluid circulated therethrough from, for example, about 90° F. to about 340° F., to raise or maintain the temperature of the fluid in the water tank above freezing, for example, above 32° F., e.g., temperatures up to or about 50° F., or temperatures up to or greater than 70° F. during freezing weather conditions, though the external heat collector(s) 16 can heat the thermal transfer fluid to any temperature above ambient temperature that facilitates raising the temperature of the fluid in the chamber 26 of the water tank 12 a suitable amount during freezing or cold weather conditions to substantially eliminate ice that would otherwise prevent daily livestock access to the drinking water.

In addition, the submersed heat exchanger 14/14' or external heat collector 16 is in communication with one or more pumps 18 or other suitable devices operable to continuously, intermittently, and/or dynamically circulate the thermal transfer fluid through the external heat collector(s) 16 and submerged heat exchanger 14/14'. In one example, the pump(s) 18 can include a 12 Volt circulation pump in electronic communication with and powered by a solar power source 20 that includes, for example, a 12 Volt solar panel, though any suitable pump(s) or fluid circulation device(s) and other solar arrays can be employed without departing from the present disclosure. The solar power source 20 further can be in communication with a battery or other power storage device that stores energy/power for operation of the pump(s) 18 during low sunlight, e.g., cloudy, conditions or at night. The pump 18 may be in fluid communication with the tubing 72/74 for circulation of the thermal transfer fluid, as generally shown in FIGS. 1-3. In one example, the pump 18 is arranged directly along the tubing 74 receiving the thermal transfer fluid exiting the heat exchanger 14/14', e.g., the pump(s) 18 can be positioned upstream of the external heat collector 16 between the submersed heat exchanger 14 and the external heat collector 16, such that the components of the pump(s) 18 are not damaged by the significantly high temperature thermal transfer fluid as it exits the external heat collector 16 (FIGS. 1 and 3). The pump(s) 18, however, can be arranged at any suitable location, e.g., downstream of the external heat collector 16 (FIG. 2), without departing from the scope of the present disclosure.

The system 10 also can include a temperature control switch 22 that is in communication with or connected to one or more temperature gauges, such as a thermometer or thermostat, arranged at least partially within the fluid in the chamber 26 the water tank 12 to continuously measure the temperature of fluid in the chamber 26 of the water tank 12 (FIGS. 1-3). The temperature control switch 22 further can be in communication with the pump(s) 18, e.g., wirelessly or through a wired connection, and can activate or deactivate the pump(s) to start or stop circulation of the thermal transfer fluid, when a measured temperature of the water in the tank 12 is above or below a specific/selected threshold value. In one example, the temperature control switch 22 can initiate the circulation of thermal transfer fluid throughout the closed loop, for example, through the tubing, the heat exchanger, and the heat collector, when the measured temperature of the water in the tank 12 is at or below 32° F. (or any other suitable temperature, such as 40° F., 50° F., 60° F., etc.) and can stop the circulation of thermal transfer fluid when the temperature of the water in the tank 12 is at or above 75° F. (or any other suitable temperature, such as 60° F., 70° F., 80° F., etc.). The temperature control switch 22, pump 18, sensors 21, etc. further can be controlled by one or more controllers having a processor, CPU, etc. and non-transitory memory or other suitable storage device. For example, a controller may be operable to activate/deactivate the pump or close/open the temperature control switch, based on one or more received signals from the sensors. The memory further may store one or more programs, instructions, workflows, etc. to facilitate operation of the temperature control switch, pump, sensors, etc.

The system 10 also can include one or more flow control valves 90 in communication with at least one of the fluid conduits 72/74 to adjust or otherwise control the flow rate of the thermal transfer fluid to achieve optimum heat transfer between the thermal transfer fluid and the water or other fluid in the tank 12.

The system 10 further can include one or more pressure control devices, such as a pressure accumulator 19 or other pressure control devices, e.g., pressure release valves, etc., in communication with the tubing 23 that are operable to release excess pressure of the thermal transfer fluid to prevent damage to the pump 18, heat collector 16, the heat exchanger 14/14', etc., for example, due to a pressure increase when the temperature of the thermal transfer fluid is increased. In one example embodiment, the pressure accumulator 19 can include a tank or vessel that can receive at least a portion of the thermal transfer fluid, for example, to relieve pressure due to significant heating thereof by the external heat collector 16.

The present disclosure, in another aspect, is directed to a method of heating water or other potable liquid in water tanks for livestock or other animals, for example remote water tanks. The method includes providing water or other fluid to a chamber 26 of a water tank 12, and continuously, intermittently, or dynamically circulating a thermal transfer fluid through a submersed heat exchanger 14, including a tubing 23 in or around the chamber 26 of the water tank 12, for example, to prevent significant freezing, warm, or otherwise maintain a temperature or temperature range of the water or other fluid in the chamber of the water tank 12. Prevention of significant freezing is understood to mean the prevention of freezing that would materially impede watering by livestock. The method further includes heating the thermal transfer fluid using one or more external heat collectors 16, e.g., solar or geothermal heat collectors, in communication with the tubing 23 and that transfers heat to the thermal transfer fluid as the thermal transfer fluid is continuously, intermittently, or dynamically circulated through the submersed heat exchanger 14. The method also may include determining the temperature of the water or other fluid in the chamber of the water tank and initiating, changing, or stopping the circulation or flow of the thermal transfer fluid when the temperature of the water is at, above, or below a threshold temperature.

A system for preventing significant freezing of fluid in the chamber 26 of a water tank 12, can comprise a solar or geothermal heat collector 16 in fluid communication with tubing 23 containing thermal transfer fluid, and said tubing 23 can extend in a subsurface position (i.e., below the surface of water or other fluid maintained in the chamber 26 of the water tank 12). The system further may comprise a pump 18 to circulate the thermal transfer fluid through the external heat collector 16 and the tubing 23.

The system also can comprise a temperature control switch 22 that activates the pump 18 when the temperature of the fluid in the chamber 26 of the water tank 12 drops below a preset or threshold temperature.

The water tank can be an open-air, livestock water tank, the fluid in the chamber of the water tank can include water or other suitable fluid for consumption by livestock or other animals. The heat collector can include any suitable solar and/or geothermal heat exchanger. The pump can be powered by one or more solar panels, and the temperature control switch further may deactivate the pump when the temperature of the water in the chamber of the water tank exceeds a preset temperature.

The temperature control can be set to a target temperature for the water in the chamber 26 of the water tank 12 in the range of about 55° F. to about 75° F. More specifically, in one example, the temperature control can be set to a target temperature of about 65° F., though the target temperature can include any other suitable value without departing from the scope of the present disclosure.

A method of reducing cold weather feed requirements for livestock may comprise maintaining the livestock drinking water temperature above freezing temperature or melting ice or other frozen liquid using the system disclosed herein.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., to the above-described embodiments, which shall be considered to be within the scope of the present invention. It therefore will be understood by those skilled in the art that while the present invention has been described above with reference to preferred embodiments, numerous variations, modifications, and additions can be made thereto without departing from the spirit and scope of the present invention as set forth in the following claims. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

The invention claimed is:

1. A solar powered watering system, comprising:
   an open air water tank at least partially defining a chamber that receives water therein, and having an at least partially open top portion that provides exterior access to the water in the chamber of the water tank;
   a heat exchanger at least partially received within the chamber, and comprising a closed loop tubing component having a thermal transfer fluid circulated therethrough to warm the water in the chamber of the water tank; the closed loop tubing component being at least partially submerged in the water and spaced from a bottom of the water tank;
   a heat collector in fluid communication with the closed loop tubing component of the heat exchanger that transfers heat to the thermal transfer fluid as the thermal transfer fluid is continuously or dynamically circulated through the heat exchanger and the closed loop tubing component; and
   one or more sensors operable to detect a temperature of the water in the chamber of the water tank,
   wherein when the one or more sensors detects that the temperature of the water is below a first threshold temperature, a pump in fluid communication with the heat exchanger starts circulation of the thermal transfer fluid through the closed loop tubing component and the pump turns off when the water is at or above a second threshold temperature greater than the first threshold temperature.

2. The system of claim 1, wherein the pump is positioned along the closed loop tubing component between the heat exchanger and the heat collector such that, when the pump is turned on, the thermal transfer fluid received by the pump from the heat exchanger is circulated first to the heat collector and then to the heat exchanger.

3. The system of claim 2, wherein the closed loop tubing component comprises at least one coil section submerged in the water in the chamber of the water tank.

4. The system of claim 1, wherein the pump is in electronic communication with a solar power source.

5. The system of claim 1, wherein the heat exchanger includes a vessel with a chamber that at least partially receives the closed loop tubing component.

6. The system of claim 5, wherein the vessel has inlets and outlets to facilitate circulation of the fluid into and out of the vessel.

7. The system of claim 1, wherein the closed loop tubing component transfers sufficient thermal energy to the water in the water tank to at least partially melt ice in the water tank.

8. The system of claim 1, further comprising one or more control valves operable to adjust a flow rate of the thermal transfer fluid.

9. A method of controlling temperature of water received in a chamber of an open air water tank, comprising:
   circulating a thermal transfer fluid through a heat exchanger with a closed loop of tubing that is at least partially submerged in the water; wherein the closed loop of tubing is spaced from a bottom of the water tank and includes at least one coil section in the water;
   heating the thermal transfer fluid using one or more heat collectors in communication with the tubing as the thermal transfer fluid is circulated through the heat exchanger and the tubing;
   determining a temperature of the water in the chamber of the water tank; and
   upon a determination that the temperature of the water is below a first threshold temperature, starting a pump in fluid communication with the heat exchanger to facilitate the circulation of the thermal transfer fluid through the closed loop of tubing and turning off the pump when the water is at or above a second threshold temperature greater than the first threshold temperature.

10. The method of claim 9, wherein the pump is positioned along the closed loop tubing between the heat exchanger and the heat collector such that, when the pump is turned on, the thermal transfer fluid received by the pump from the heat exchanger is circulated first to the one or more heat collectors and then to the heat exchanger.

11. The method of claim 10, wherein the closed loop of tubing comprises a plurality of substantially parallel portions connected by respective curved portions of a plurality of curved portions.

12. The method of claim 9, wherein the circulating of the thermal transfer fluid through the heat exchanger comprises pumping the thermal transfer fluid with the pump that is in fluid communication with the heat exchanger.

13. The method of claim 12, wherein the pump is in electronic communication with a solar power device, and the heat collector is a solar heat collector.

14. The method of claim 13, wherein determining the temperature of the water in the chamber of the water tank comprises receiving a temperature measurement from a sensor and wherein a submerged portion of the closed loop of tubing is oriented to warm an upper layer of the water in the water tank.

15. The method of claim 14, wherein the sensor is in electronic communication with a temperature control switch operable to activate or deactivate the pump and wherein the submerged portion of the closed loop of tubing is positioned at or near an interior perimeter of the chamber of the water tank at a depth of at least one foot from a top opening of the chamber.

16. The method of claim 12, further comprising:
adjusting a flow rate of the thermal transfer fluid by adjusting one or more control valves.

17. A solar powered watering system, comprising:
an external heat collector comprising one or more solar thermal collectors;
an open air water tank configured to receive water therein, wherein the water tank has sidewalls at least partially formed from low thermal conductivity materials selected from the group comprising: rubber, plastic, polymeric material, polyethylene, metallic materials, steel, copper, aluminum, concrete, cementitious materials, composite materials, fiber reinforced composite materials, and combinations of these materials;
a heat exchanger comprising a closed loop of tubing containing thermal transfer fluid;
wherein the closed loop of tubing is at least partially submerged in the water and is not integral with a bottom of the water tank; and,
wherein when one or more sensors detects that the temperature of the water is below a first threshold temperature, a pump in fluid communication with the heat exchanger starts circulation of the thermal transfer fluid through the closed loop tubing and the pump turns off when the water is at or above a second threshold temperature greater than the first threshold temperature.

18. The system of claim 17, wherein the sidewalls of the water tank are at least partially formed from materials selected from the group comprising: rubber, concrete, and combinations of rubber and concrete, wherein a submerged portion of the closed loop of tubing is positioned at or near an interior perimeter of the chamber of the water tank at a depth of at least one foot from a top opening of the chamber, and further comprising one or more control valves operable to adjust a flow rate of the thermal transfer fluid.

19. The system of claim 17, wherein the one or more solar thermal collectors comprise one or more evacuated tube collectors; wherein the sidewalls of the water tank are formed of rubber, concrete, or a combination of rubber and concrete; wherein the pump is solar powered and is positioned along the closed loop tubing between the heat exchanger and the heat collector such that, when the pump is turned on, the thermal transfer fluid received by the pump from the heat exchanger is circulated first to the heat collector and then to the heat exchanger; wherein the thermal transfer fluid flowing through the closed loop tubing from the one or more evacuated tube collectors to the heat exchanger has a temperature of at least about 90 degrees Fahrenheit and a freezing point below 32 degrees Fahrenheit; wherein the thermal transfer fluid comprises a food grade antifreeze; and wherein the one or more sensors are positioned at or below a surface of the water in the open air water tank.

20. The system of claim 19, further comprising a pressure relief valve.

* * * * *